United States Patent
Hanna et al.

(10) Patent No.: US 7,522,556 B2
(45) Date of Patent: Apr. 21, 2009

(54) SIGNAL RECOGNITION IN AN ON-FREQUENCY REPEATER

(75) Inventors: Wag Hanna, Ottawa (CA); Colin Kellett, Ramsbury (GB); Theodore Pantazopoulos, Ottawa (CA); Mike Roper, Ottawa (CA); Russell Smith, Ottawa (CA); Quilin Yuan, Kanata (CA); Jie Zhang, Kanata (CA)

(73) Assignee: Spotwave Wireless Inc., Ontario (CA)

( * ) Notice: Subject to any disclaimer, the term of this patent is extended or adjusted under 35 U.S.C. 154(b) by 477 days.

(21) Appl. No.: 11/071,641

(22) Filed: Mar. 3, 2005

(65) Prior Publication Data
US 2005/0232194 A1 Oct. 20, 2005

(30) Foreign Application Priority Data
Mar. 3, 2004 (CA) .................................. 2459428

(51) Int. Cl.
*H04Q 7/00* (2006.01)
*H04B 17/02* (2006.01)

(52) U.S. Cl. ........................... 370/329; 455/7; 375/270; 375/321; 375/213; 375/211; 375/142; 375/150; 375/343

(58) Field of Classification Search ....................... 455/9, 455/20; 375/211, 142, 150, 270, 279, 280, 375/318, 321, 329, 332, 343, 345, 323
See application file for complete search history.

(56) References Cited

U.S. PATENT DOCUMENTS

| 3,662,115 | A | * | 5/1972 | Saito et al. ................... 704/200 |
| 6,088,384 | A | * | 7/2000 | Hindman ..................... 375/150 |
| 6,263,009 | B1 | * | 7/2001 | Ramberg et al. ............. 375/130 |
| 6,807,405 | B1 | * | 10/2004 | Jagger et al. ................. 455/296 |
| 6,889,033 | B2 | * | 5/2005 | Bongfeldt ................... 455/11.1 |
| 7,061,967 | B2 | * | 6/2006 | Schelm et al. .............. 375/147 |
| 7,206,336 | B1 | * | 4/2007 | Rog et al. .................... 375/150 |
| 2004/0190438 | A1 | * | 9/2004 | Maltsev et al. .............. 370/206 |

OTHER PUBLICATIONS

U.S. Appl. No. 10/359,096, filed Feb. 2003, Roper et al.

* cited by examiner

*Primary Examiner*—Lester Kincaid
*Assistant Examiner*—Matthew Sams
(74) *Attorney, Agent, or Firm*—Marshall, Gerstein & Borun LLP

(57) ABSTRACT

An intelligent gain controller (IGC) for an on-frequency repeater implements a method for identifying a desired narrow band signal within a broadband RF signal. Thus, a candidate narrow band signal within the broadband signal is isolated. The isolated narrow band signal is then processed to detect repeating features of the narrow band signal. The detected repeating features are then analyzed to identify the signal type of the isolated narrow band signal. System gain of the in-frequency repeater can be controlled based on the power level of the identified narrow band signal.

10 Claims, 7 Drawing Sheets

SIGNAL RECOGNITION IN AN ON-FREQUENCY REPEATER

CROSS-REFERENCE TO RELATED APPLICATIONS

This application is based on, and claims priority from Canadian Patent Application No. 2,459,428 filed Mar. 3, 2004.

MICROFICHE APPENDIX

Not Applicable.

TECHNICAL FIELD

The present application relates to wireless access networks and, in particular, to a method and system for signal recognition in an on-frequency repeater.

BACKGROUND OF THE INVENTION

On-frequency repeaters are known in the art, for amplifying an input signal without otherwise altering its frequency spectrum. In some cases, an on-frequency repeater may also employ various types of active circuitry in order to enhance the signal-to-noise (S/N) ratio, in addition to simply increasing the power level. A typical application of on-frequency repeaters is for improving wireless services within defined regions of a wireless network, where signal levels would otherwise be too low for satisfactory quality of service. For example, within a building, or a built-up urban area, signal attenuation, shadowing by buildings and/or hills, noise generated by various radio frequency sources, and multi-path effects can seriously degrade the quality of desired RF signals. In some cases, a wireless network provider may install a repeater in order to improve service in a region lying at an edge of the coverage area serviced by a base station, thereby effectively extending the reach of the base-station, On-frequency repeaters are characterized by the fact that on input signal is amplified and retransmitted by the repeater at the same carrier frequency. For the purposes of the present invention, the term "on-frequency repeater" shall be understood to refer to any amplifier system that has this characteristic, irrespective of whether the system is used as part of an wireless communications network, or in any other context. The external input signal received by the repeater (e.g. from a base station or a subscriber's wireless communications device—WCD) can be represented by:

$$Se = A(t) \cdot \text{Cos}(\omega t + m(t)) \quad (1)$$

Where A(t) is the amplitude information of the external input signal, ω is the carrier frequency and m(t) is the phase information of the carrier signal. In this case, the corresponding output signal radiated by the repeater can be represented by:

$$So = G \cdot A(t) \cdot \text{Cos}(\omega(t-\delta) + m(t-\delta)) \quad (2)$$

Where G is the repeater gain and δ is the time delay through the repeater at the carrier frequency ω.

It will be seen that the output signal (So) radiated by the repeater is a replica of the input signal received by the repeater, that has been amplified and subject to a time delay δ due to electrical delays within the repeater. Part of this delay is inherent to the amplification process, but is primarily caused by band-pass filters used in the repeater to prevent the unwanted amplification of signals outside the frequency band of interest. Generally this delay is inversely proportional to the bandwidth of the filters. The repeater gain (G) provides the increase in signal level that makes the repeater useful.

As will be appreciated, successful operation of the repeater requires that it provide sufficient system gain G to compensate for propagation losses. On the other hand, if the gain (in either the uplink or downlink paths) is too high, the repeater will radiate unnecessarily high signal power to mobile stations within its coverage area and/or the base station. In an environment in which there is more than one repeater in use, radiation of excessive signal power in the downlink path can cause interference (in the form of multiple overlapping coverage areas) with other subscribers. The same holds true for a single repeater radiating excessive power in the downlink path causing interference to other subscribers outside the intended coverage area of the repeater. Similarly, radiation of excessive signal power to the base-station may cause interference with other base-stations and/or other users of the wireless communications network.

Automatic Gain Controllers (AGCs) capable of controlling signal gain are known in the art. Typically, AGCs are implemented as analog RF or IF circuits, in which a variable gain amplifier (VGA) is used to amplify the analog RF signal. The VGA is normally controlled by a control signal derived from a measured signal parameter. In open-loop systems, the measured signal power is normally the output signal power, that is, the power level of the RF signal being supplied to an antenna for transmission. Thus, for example, in the downlink path (from the base station to the mobile station within the local coverage area) the power level of the downlink signal supplied to the coverage area antenna is monitored by a feed-back path and used to generate the VGA control signal. This arrangement enables the VGA to provide a variable gain, so that the effective radiated power (ERP) of the downlink RF signal is approximately constant, in spite of variations in the received power of the downlink RF signal from the base station. A directly analogous operation is also performed in the uplink path, so that the effective radiated power (ERP) of uplink RF signals transmitted to the base station will be approximately constant, even with wide variations in the received power of the downlink RF signal from the base station.

A limitation of this arrangement is that the signal power level measured at the repeater output represents the total power within the signal path, rather than the power levels of desired traffic signals within it. In particular, the signal path will normally have a bandwidth of 25 MHz, or more, and contain multiple channels. In many wireless communications systems, such as Time Division Multiple Access (TDMA), Advanced Mobile Phone Service (AMPS) and the 15-95 CDMA (Code Division Multiple Access) system, the signal power within the control channel(s) will remain approximately constant, but the power level in each of the data channels will fluctuate widely in accordance with variations in the signal traffic. However, the AGC cannot discriminate between a power level increase due to increased traffic in a data channel, and power level increases due to any other cause (such as an increase in the received signal power). In all cases, the AGC will respond to increased output power by reducing gain. Where the measured power level increase is due to increased data channel traffic, however, this produces the undesired result that the AGC has responded to the increased data traffic by attenuating the signal power.

Applicant's co-pending U.S. patent application Ser. No. 10/359,096 filed Feb. 6, 2003 provides an Intelligent Gain Control method and system which operates by identifying and isolating a desired narrow band channel within a broadband signal path. The gain of the broadband signal path is then controlled to maintain the ERP of the isolated channel substantially constant. Thus broadband gain control is implemented based on narrow band power levels of desired channels within the broadband signal path. This avoids the limitation of prior art AGC systems, in which path gain is controlled based on the total power level (of all of the traffic) within the signal path.

A limitation of this approach is that the IGC can become unreliable if signal traffic within the isolated narrow band channel is discontinuous. In the system of U.S. patent application Ser. No. 10/359,096, this problem is addressed by hunting for and isolating a control channel within the signal path as the desired channel for controlling gain of the signal path. Use of a control channel for gain control improves reliability because such channels almost always carry a valid signal, even when little or no subscriber data traffic is being conveyed through the network. For many common wireless communications systems, such as TDMA and AMPS, such control channels can be readily isolated. However, for some communications systems, such as mixed format (e.g. Motorola's proprietary integrated Digital Enhanced Network-iDEN) communications systems, the control channel signaling may be discontinuous. In other systems, such as the Global System for Mobile Communications (GSM) the control channel signaling may not be readily distinguishable from other signal traffic or indeed from background noise.

Accordingly, a method and system capable of reliably recognizing desired narrow band signals within a broadband signal path remains highly desirable.

SUMMARY OF THE INVENTION

An object of the present invention is to provide an apparatus for identifying narrow band signals within a broadband signal path.

Accordingly, an aspect of the present invention provides a method for identifying a desired narrow band signal within a broadband RF signal. According to the invention, a candidate narrow band signal within the broadband signal is isolated. The isolated narrow band signal is then processed to detect repeating features of the narrow band signal. The detected repeating features are then analyzed to identify the signal type of the isolated narrow band signal.

A further aspect of the present invention provides a method and systems for controlling a gain of an on-frequency repeater. According to the invention, a broadband radio frequency (RF) signal is received within a signal path of the repeater. A desired narrow band signal within the broadband RF signal is identified, and gain of the signal path controlled in accordance with the power level of the narrow band signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The following description utilizes representative power levels, power ranges, channel frequencies and band-widths in order to illustrate various features of the present invention. Those skilled in the art will appreciate, however, that the present invention is by no means limited to such values. On the contrary, those skilled in the art will readily understand that the present invention can be deployed for use in conjunction with any wireless communications network, and it is to be expected that the power levels, power ranges, channel frequencies, and band-widths stated herein will be modified to conform to the requirements of the communications network in question. Such modifications are considered to be well within the purview of those of ordinary skill in the art, and lie within the intended scope of the appended claims.

Figure 1:
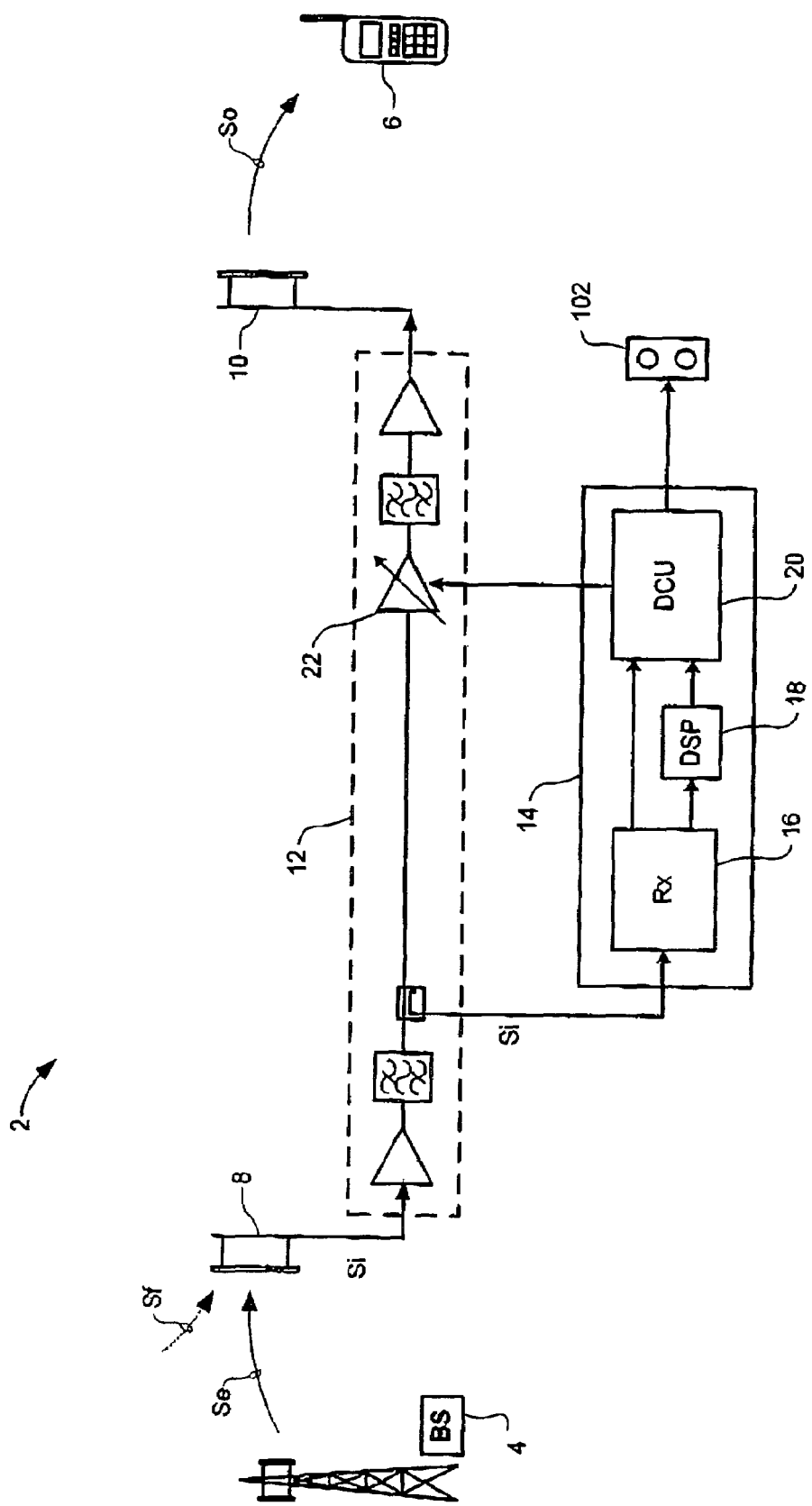
FIG. 1 is a block diagram schematically illustrating principle elements of an On-frequency Repeater in accordance with an embodiment of the present invention.

The present invention provides methods and systems for recognizing a desired channel signal within broadband signal traffic traversing an on-frequency repeater. The present invention can conveniently be deployed as part of, or in conjunction with an Intelligent Gain Controller (IGC). In general, such an IGC operates to control the gain of the repeater to facilitate reliable communications between subscribers' wireless communications device(s) and a fixed station of the network, while mitigating potential interference. The present invention enhances this functionality by enabling the IGC to recognize a specific desired channel signal, and control the repeater gain based on that signal. FIG. 1 is a block diagram schematically illustrating an on-frequency repeater in accordance with a representative embodiment of the present invention.

As shown in FIG. 1, the repeater 2 is functionally positioned between a fixed station 4 of the wireless communications network (not shown) and one or more mobile stations (MSs) 6, such as subscribers' wireless communications devices. The repeater 2 receives and controls (i.e., amplifies and/or attenuates) RF signal traffic between the fixed and mobile stations 4 and 6, without performing any signal formatting or protocol conversion, thereby rendering the repeater 2 transparent to both the fixed station 4 and the MS 6. The MS 6 may take the form of any conventional wireless communications device, such as, for example, Personal Digital Assistants (PDA's), wireless telephone handsets, pagers, and one and two-way wireless messaging devices.

In the embodiment of FIG. 1, the repeater 2 comprises a donor antenna 8 for receiving an external input signal (Se) from the base station 4. The donor antenna 8 also receives feedback and multi-path signals (Sf) which are added to the external input signal (Se) to generate a received signal (Si). A signal path 12 is coupled between the donor antenna 8 and a subscriber antenna 10 in order to amplify the received signal (Si) for retransmission as an output signal (So). If desired, the signal path 12 may include an Intermediate Frequency (IF) section (not shown) to facilitate filtering, amplification, and other signal processing functions. An Intelligent Gain Controller (IGC) 14 operates to control gain of the signal path 12, as will be described in greater detail below, and generally comprises a narrow-band receiver 16 connected to the signal path 12 so as to receive the input signal Si; a digital signal processor (DSP) 18 implementing a signal detection algorithm and decision algorithm; and a digital controller (DCU) 20 for providing overall control of the gain of the signal path 12, for example by adjusting a variable gain amplifier (VGA) 22.

FIG. 1 shows a single RF signal path 12 coupled between the donor antenna 8 and subscriber antenna 10. This arrangement carries unidirectional downlink RF signal traffic from the base station 4 to the MS 6. Bi-directional signal traffic through the repeater 2, in order to convey uplink signal traffic from the MS 6 to the base station 4, can readily be accommodated by mirroring the system of FIG. 1, or by coupling respective uplink and downlink signal paths between the two antennas 8 and 10 via diplexers. Both of these solutions are well known in the art, and accordingly will not be described in greater detail herein.

In general, the bandwidth of the signal path 12 will be selected to encompass the range of frequencies that are expected to be used by the communications network within which the repeater will operate. For example, in North America, publicly accessible Advanced Mobile Phone Service (AMPS) and Time Division. Multiple Access (TDMA) cellular communications networks typically utilize a 25 MHz uplink and downlink path bandwidth centered on 836.5 MHz and 881.5 MHz, respectively. Global System for Mobile Communications (GSM) and Code Division Multiple Access (CDMA) networks utilize respective different bands, each having known bandwidth and center frequencies. In some cases, it will be desirable to make the bandwidth of the signal path 12 broad enough to encompass traffic of multiple different networks. In such cases, the signal path 12 may have a bandwidth of 60 MHz, or more, and carry any one or more of AMPS/TDMA, GSM, CDMA and other traffic types.

The Intelligent Gain Controller 14 of present invention operates by identifying and isolating a desired narrow band channel signal within the signal path 12, and then controls the gain of the signal path 12 to maintain the ERP of the isolated channel substantially constant. Thus the present invention implements broadband gain control based on the power level of a desired channel signal within the signal path 12. This avoids the limitation of prior art AGC systems, in which path gain is controlled based on the total power level (of all of the traffic) within the signal path. In the case of AMPS/TDMA, GSM, CDMA communications networks, the IGC preferably hunts for and isolates a control channel within the signal path 12, as the desired channel for controlling system gain. As described in detail in applicant's co-pending U.S. patent application Ser. No. 10/359,096 filed Feb. 6, 2003, this arrangement is advantageous in that the control channel almost always carries a valid signal, even when there is little or no subscriber data traffic. Another benefit of this arrangement is that, in AMPS/TDMA, and CDMA communications networks the location of the control channel within the spectrum of the input signal Si may be known in advance, and thus can be readily found by the IGC.

The present invention improves over the above system by enabling the IGC to recognize predetermined signal types within the input signal Si by analyzing characteristic features of the signals themselves. Thus the present invention can recognize a desired control (or data) channel within the received signal Si, even when the location of that channel is unknown in advance, may change over time, or may be discontinuous. Examples of such signals are GSM and Motorola's proprietary integrated Digital Enhanced Network (iDEN) mixed media signaling.

Figure 2:
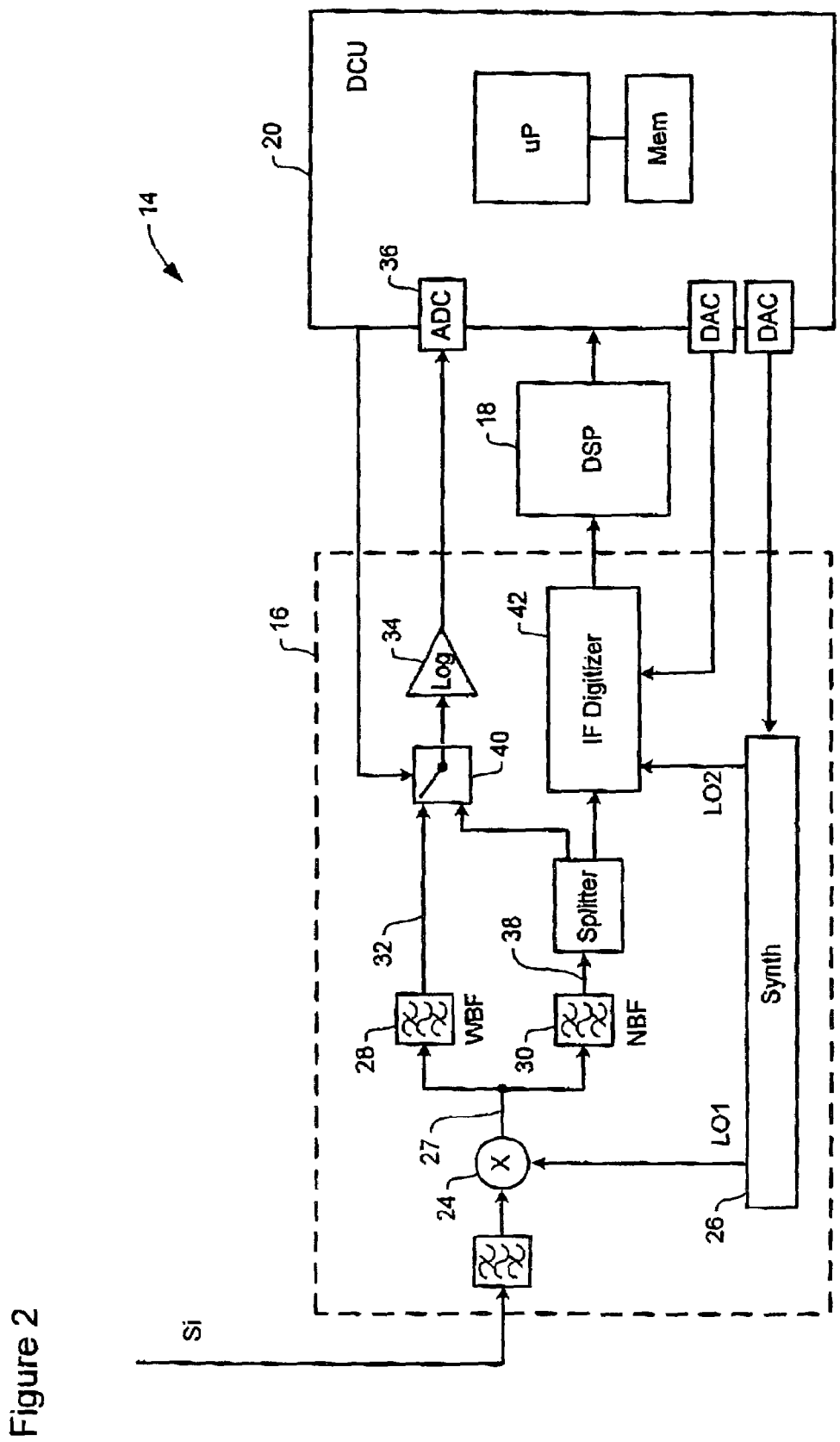
FIG. 2 is a block diagram schematically illustrating the Intelligent Gain Controller (IGC) of FIG. 1 in greater detail.

As shown in FIG. 2, the narrow-band receiver 16 operates under control of the DCU 20 to detect/isolate narrow-band signals within the broadband input signal Si. Thus, the narrow-band receiver 16 comprises a mixer 24 driven by local oscillator signal LO1 generated by a synthesizer 26 for down-converting the input signal Si to a desired intermediate frequency (IF) signal 27. The synthesizer 26 operates under control of the DCU 20 to select the frequency of the local oscillator signal LO1, which permits the narrow band receiver 16 to isolate desired signals across the entire bandwidth of the signal path 12. The IF signal 27 is then filtered to remove out-of band noise. In the embodiment of FIG. 2, a pair of parallel filters 28 and 30 are provided, which permits the DCU to select the bandwidth of the isolated signal 27. In this case, a "wide" band filter 28 may be used to isolate a sub-band signal 32 having a bandwidth of, for example 1.25 MHz, which may be used to rapidly scan through an entire frequency range of interest to detect the presence (or absence) of signal traffic. Thus the power level of the sub-band signal 32 is detected (e.g. by a log amplifier 34) and sampled by an Analog-to Digital Converter (ADC) 36 of the DCU 20. As will be appreciated, the sub-band signal 32 will normally encompass more than one subscriber channel signal, and thus enable a coarse level of signal analysis, which is useful for rapidly identifying a range of frequencies that are carrying subscriber or other network traffic.

Once the DCU 20 has located a sub-band signal 32 in which signal traffic is present, a "narrow" band filter 30 having a bandwidth of, for example 25 kHz, may be used to isolate an individual channel signal 38. Thus the power level of the channel signal 38 can be detected by the log amplifier 34, via a selector switch 40 controlled by the DCU 20, and sampled by ADC 36. The sampled power level can then be used by the DCU 20 to adjust gain of the signal path 12. As may be appreciated, the sampled power level of the channel signal 38 may also be used to implement other functions. For example, the DCU 20 may monitor the channel signal power over a period of time. In some networks (e.g. AMPS/TDMA, GSM, and CDMA), this functionality can be used by the DCU 20 to recognize a control channel, or a data channel that is usable for gain control.

As shown in FIG. 2, the channel signal 38 can also be supplied to an IF digitizer 42, which converts the analog channel signal 38 into a stream of digital samples which can be processed by the DSP 18. This arrangement enables in-depth analysis of the channel signal 38, in accordance with virtually any desired algorithm. A representative embodiment is described in detail below with reference to FIGS. 3 and 4.

Figure 3:
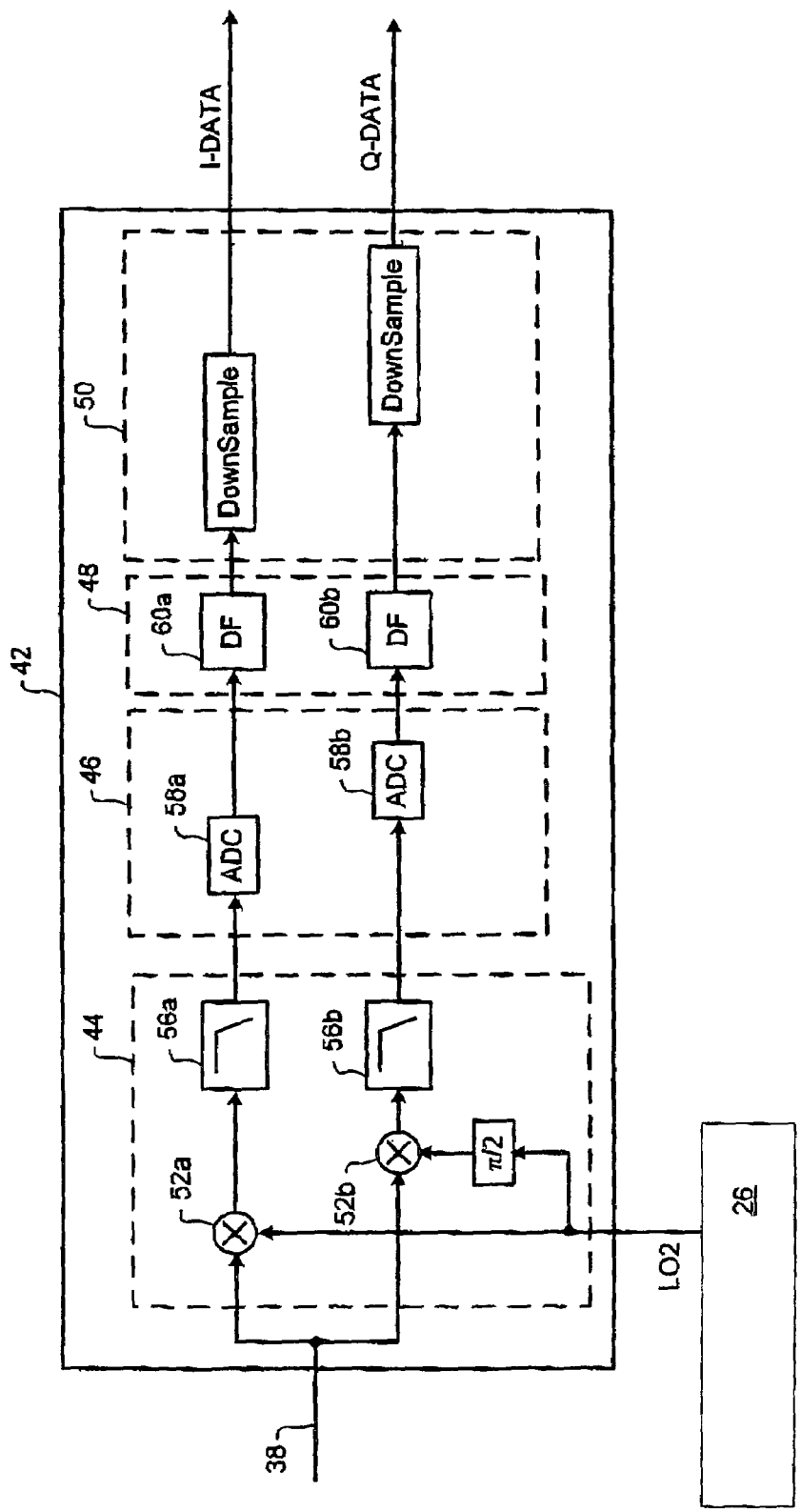
FIG. 3 is a block diagram schematically illustrating the IF digitizer of FIG. 2.
Figure 4:
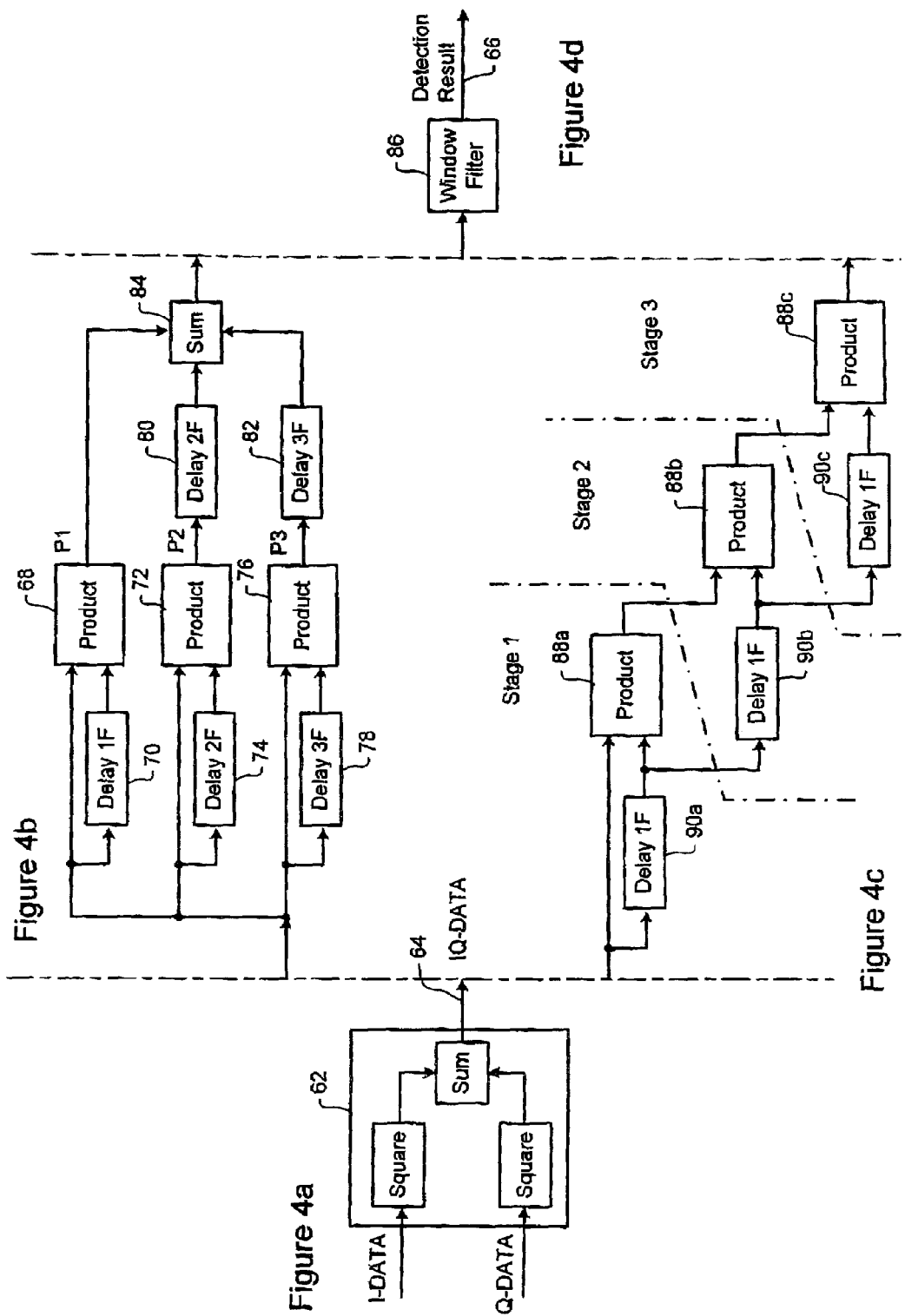
FIGS. 4a-4d are block diagrams schematically illustrating principal steps of two alternative signature detection algorithms implemented by the DSP of FIG. 1.

As shown in FIG. 3, the IF digitizer 42 comprises a quadrature demodulator 44 for downconverting the channel signal 38 to baseband; a quadrature ADC 46 for sampling In-phase (I) and Quadrature (Q) signal components of the baseband signal and generating corresponding digital component signals; and an anti-aliasing filter 48. If desired, a downsampler 50 may be used to reduce the sample rate of the I and Q digital component signals. The quadrature demodulator 44 comprises a pair of parallel mixers 52a, 52b connected to receive the channel signal 38. One mixer 52a combines the channel signal 38 with a local oscillator signal LO2 generated by the synthesizer 26 to down-convert the channel signal 38 to the baseband In-phase (I) signal component. The other mixer 52b combines the channel signal 38 with a $\pi/2$ phase delayed version of LO2, and thus down-converts the channel signal 38 to a baseband Quadrature (Q) signal component. Low pass filters 56 can be used to remove out-of band noise, if desired. The local oscillator signal LO2 may suitably be controlled by the synthesizer 26, which provides "fine tune" control to accommodate variations in the channel signal center frequency.

The quadrature ADC 46 comprises a pair of parallel analog-to-digital converters 58, each of which samples a respective one of the I and Q signal components at a desired sample rate SR1. The sample rate SR1 may suitably be controlled by the synthesizer 26, and may be selected as desired to enable identification of specific features of the channel signal 38. For example, in cases where the symbol rate of a desired channel signal is known, then the sample rate may be selected to satisfy the Nyquist criteria for that known symbol rate. Of course, a higher sample rate may also be utilized, if desired. In any event, each analog-to-digital converter 58 outputs a respective digital component signal as a series of n-bit sample values. As is well known in the art, the number (n) of bits in each sample can be selected to balance precision and cost.

Figure 6A:
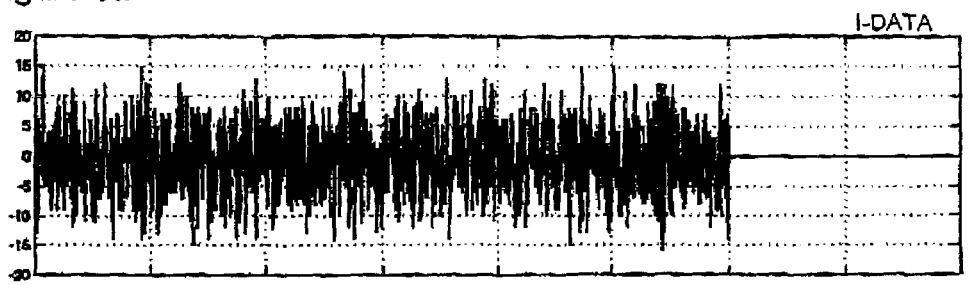
FIGS. 6a-6d are graphs illustrating operation of the IGC in the case of an input signal which is a desired signal.
Figure 6B:
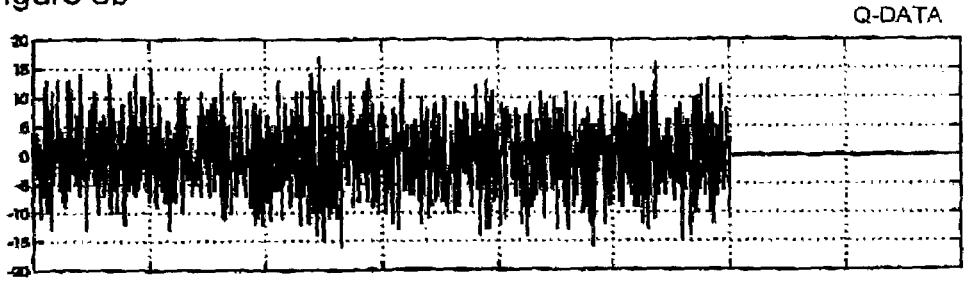

The anti-aliasing filter 48 comprises a parallel pair of digital filters 60, each of which digitally filters a respective one of the I and Q signal components, in a manner known in the art. If desired, the downsampler 50 can be used to reduce the sample rate of the I and Q signal components. This functionality can be used to reduce the complexity (and thus cost) of the DSP, particularly in cases where the associated loss of data (due to discarded samples) will not adversely affect signal analysis. As shown in FIG. 3 the output of the IF Digitizer 42 is a pair of parallel data streams, denoted as I-Data and Q-Data, respectively representing the In-Phase and Quadrature components of the channel signal 38. These data streams are then supplied to the DSP 18. Representative I-Data and Q-Data signals are illustrated in FIGS. 6a and 6b respectively.

As will be appreciated, the DSP 18 may be configured using any suitable combination of hardware and software to implement virtually any desired signal analysis algorithm. This may include time-domain and/or frequency-domain (spectral) analysis of the I-Data and Q-Data signals. With this arrangement, known techniques can be used to detect the presence of any of a wide variety of features (or signal artifacts) embedded within the input signal Si. In the illustrated embodiment, the DSP 18 implements a detection algorithm which detects repeating features (which may, for example, be associated with a synchronization symbol) embedded within the channel signal 38. FIG. 4a-c illustrate two alternative detection algorithms which may be used for this purpose.

As shown in FIG. 4a, phase uncertainties in the I-Data and Q-Data signals received from the IF Digitizer 42 are removed (at 62) by computing a sum of squares of the I-Data and Q-Data signals, to generate a composite IQ-Data signal 64. This IQ-Data signal can be processed using either a parallel autocorrelation scheme (FIG. 4b) or a cascaded autocorrelation scheme (FIG. 4c), to obtain a detection result signal 66, as will be described below, As shown in FIG. 4b, the parallel autocorrelation scheme operates by computing products of the IQ-Data signal 66 and delayed versions of it. The products are then summed, and window filtered. Thus, in the illustrated embodiment, three products are computed as follows: product P1 computed (at 68) as a product of IQ-Data 66 and a version of I-Q Data which has been delayed (at 70) by 1 "frame"; product P2 computed (at 72) as a product of IQ-Data and a version of IQ-Data which has been delayed (at 74) by 2 frames; and product. P3 computed (at 76) as a product of IQ-Data and a version of IQ-Data which has been delayed (at 78) by 3 frames. As will be appreciated, this series may be continued to encompass as many products as desired. In all cases, the length of a "frame" is determined based on known properties of the desired channel signal. More particularly, if the desired channel signal has a feature (such as a synchronization symbol) which is known to repeat at a specific rate, then the duration of each frame would be selected to match that repetition rate. In cases where either the signal type and/or repetition rate are unknown, then the frame size can be varied, so as to search for repeating features within the channel signal 38.

Products P2 and P3 are then delayed by 2-frames (at 80) and 3-frames (at 82), respectively, and then summed (at 84) with product P1. The summation result is (a digital signal) characterized by a pattern of signal amplitude corresponding to any features of the channel signal 38 which repeat at the selected frame rate. If desired, the window filter 86 can be used to isolate a selected number of consecutive peaks (or, if desired, a selected number of samples) in order to facilitate further processing, as will be described below.

Figure 6C:
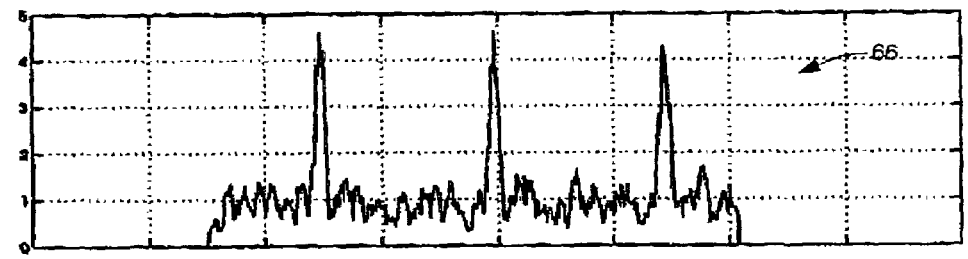

FIG. 4c illustrates a representative cascaded autocorrelation algorithm. As may be seen, in a first stage of the cascaded autocorrelation algorithm, the IQ-Data signal 64 is multiplied (at 88) by a version of itself which has been delayed (at 90) by 1 frame. In each successive stage, the product of the previous stage is multiplied by a further delayed version of the IQ-Data signal 64. The output of the final stage is then filtered by the window filter 86 as described above. As with the embodiment of FIG. 4b, the cascaded autocorrelation algorithm generates a detection result signal characterized by a pattern of peaks which correspond to features of the channel signal 38 which repeat at the selected frame rate, as illustrated in FIG. 6c.

For example, observation of the iDEN signal type shows that it includes a synchronization symbol which repeats with a period of 0.015 Sec. Accordingly, a sample rate of the I-Data and Q-Data signals (at the output of the IF digitizer 42) of 40 kHz yields a repetition period of 600 samples. Accordingly, an iDEN channel signal can be detected by setting the frame duration equivalent to 600 samples, which yields a detection signal with a peak (corresponding to the synchronization symbol) located about every 600 samples. This operation is illustrated in FIGS. 6a-6c. Thus, an iDEN channel signal 38 supplied to the IF digitizer 42 yields the I-Data and Q-Data signals illustrated in FIGS. 6a and 6b, respectively. Using these I-Data and Q-Data signals as input, the detection algorithm executed by the DSP 18 generates the detection result signal illustrated in FIG. 6c, in which signal peaks corresponding to the iDEN synchronization symbols can readily be seen. It will be noted that the detection result signal is a continuous signal with peaks appearing at regular intervals. The chart of FIG. 6c shows the detection result signal at the output of the window filter, which in this case has a width of about 1800 samples, and thus will isolate a series of three peaks for further processing.

Figure 7A:
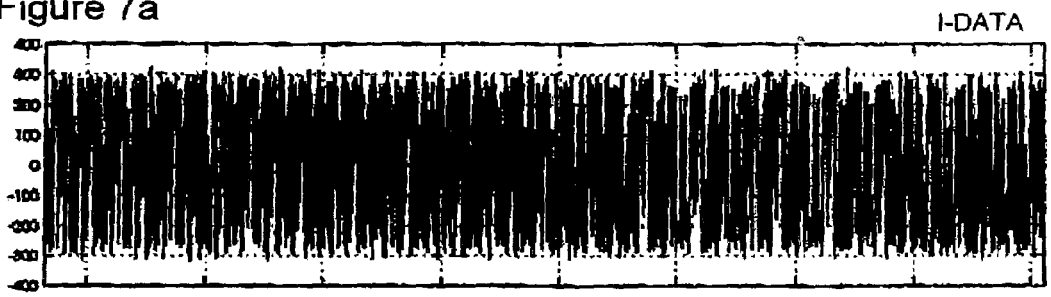
FIGS. 7a-7d are graphs illustrating operation of the IGC in the case of an input signal which is not a desired signal.
Figure 7B:
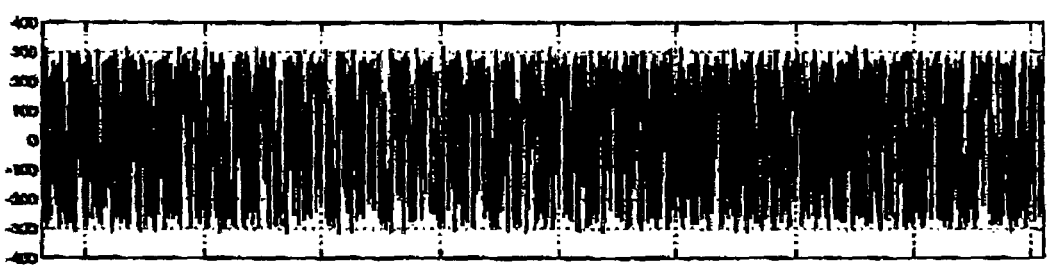
Figure 7C:
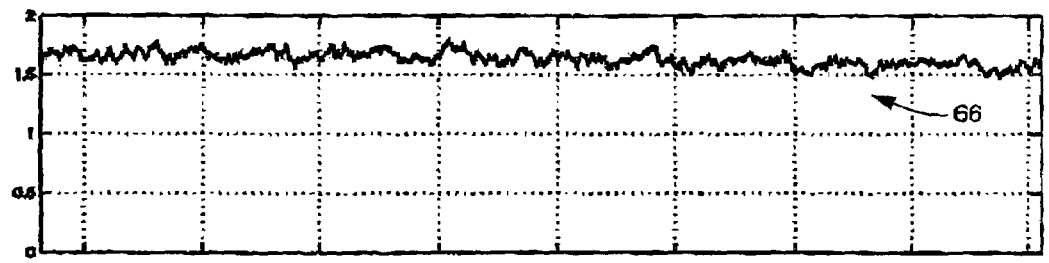

By way of comparison, FIGS. 7a-7c respectively illustrate I-data, Q-Data and detection result signals (corresponding to FIGS. 6a-6c) for the case in which the channel signal 38 does not contain any features which repeat at the selected frame rate. The lack of a clearly discernable pattern of peaks in the detection result signal 66 of FIG. 7c is readily seen by comparison with FIG. 6c.

Either of the autocorrelation algorithms illustrated in FIGS. 4b and 4c may be used in the present invention. The parallel autocorrelation technique illustrated in FIG. 4b has an advantage that the detection results signal can be produced with minimum computing time by the DSP 18. For example, the three-tier example shown in FIG. 4b is capable of generating detection result signal having three successive peaks (for each repeating feature) using only three frames of samples of the IQ-DATA signal. On the other hand, the cascaded autocorrelation technique of FIG. 4c increases the Signal to Interference and Noise Ratio (SINR), and thus is more robust against variations in carrier signal frequency.

Figure 5:
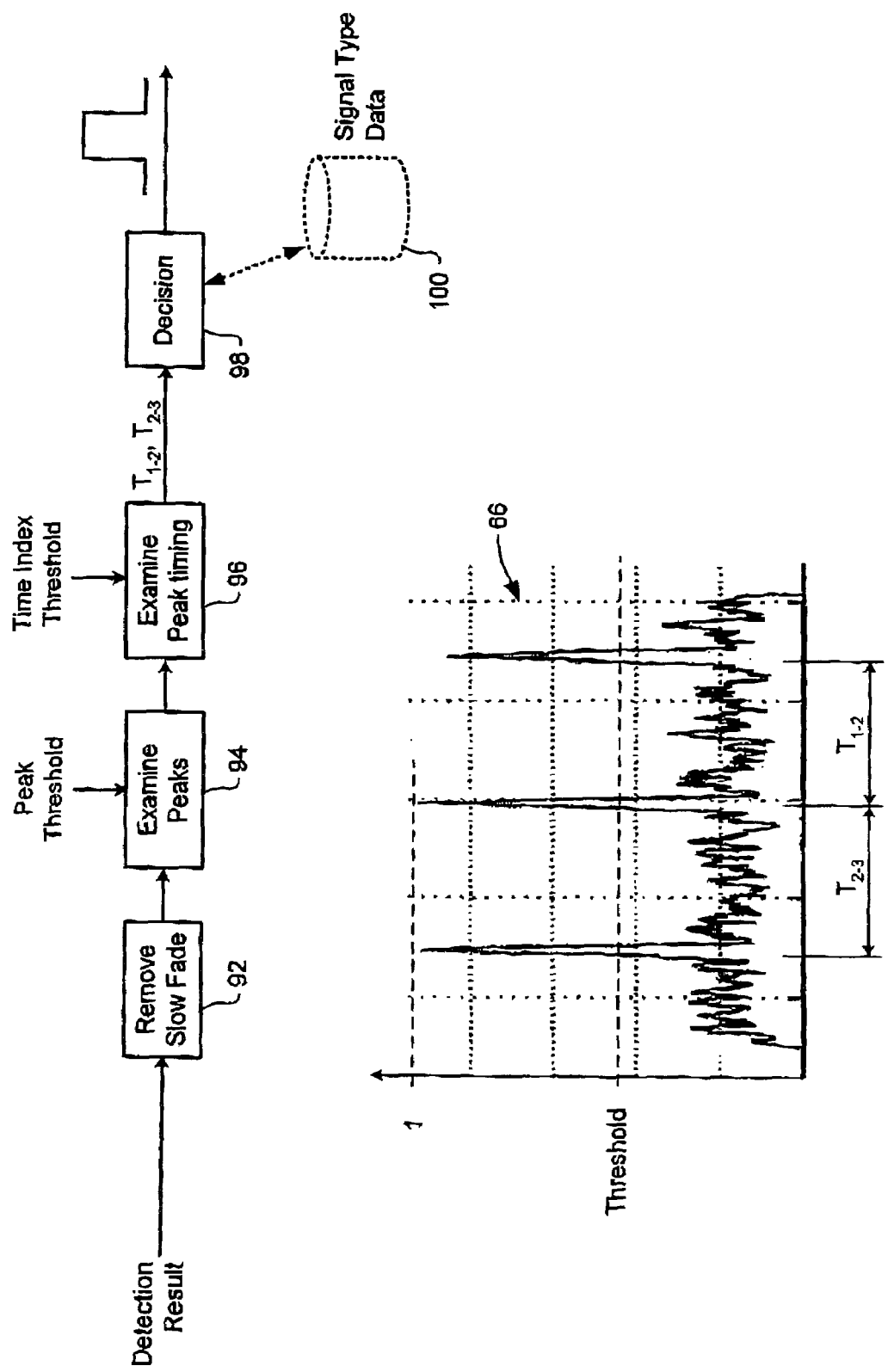
FIG. 5, is a block diagram illustrating principal steps of a decision algorithms implemented by the DSP of FIG. 1.

As is well known in the art, each different type of communications signal is formatted in accordance with a specific standard. Some standards include signal elements (such as synchronization symbols, pilot signal bit sequences, etc.) which repeat at predetermined intervals. In each such case, the number and location of repeating elements, and their repetition rate, are typically unique to each standard. As a result, it is possible to recognize at least the signal type by analyzing the pattern of peaks appearing in the detection result signal. It should be noted that, using the methods of the present invention, it is not necessary to decode the channel signal 38, or to know what the repeating elements represent in any specific standard. It is sufficient to merely know that the signal contains elements or features (which may be empirically discovered by observation of the signal) which repeat at a particular repetition rate (which can also be discovered empirically as described above), and to associate the resulting pattern of peaks with the specific signal type. FIG. 5 is a block diagram illustrating a representative "decision" algorithm for performing the latter function.

In general, signal recognition is a "pattern-matching" operation, in which the pattern of peaks appearing in the detection result signal (see FIG. 6c) is matched to a known peak pattern associated with a particular signal type. As may be appreciated, various techniques may be used for this purpose. In the embodiment of FIG. 5, the decision result signal 66 is normalized (at 92), so that the highest peak has a nominal amplitude of "1". The normalized signal is then supplied to a peak comparator 94, and compared with a predetermined threshold value. The peak comparator 94 uses the threshold value as a "slicing level" to isolate each peak from surrounding signal noise. The timing of each isolated peak is then compared to a known timing of a known signal type. If the timing matches within a predetermined tolerance, then the channel signal 38 is considered to be a signal of the known type.

Figure 6D:
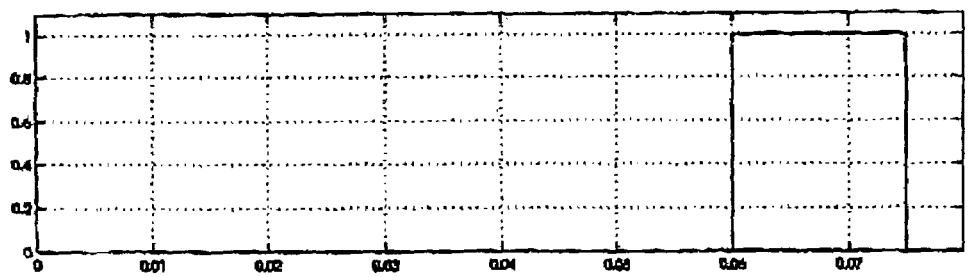
Figure 7D:
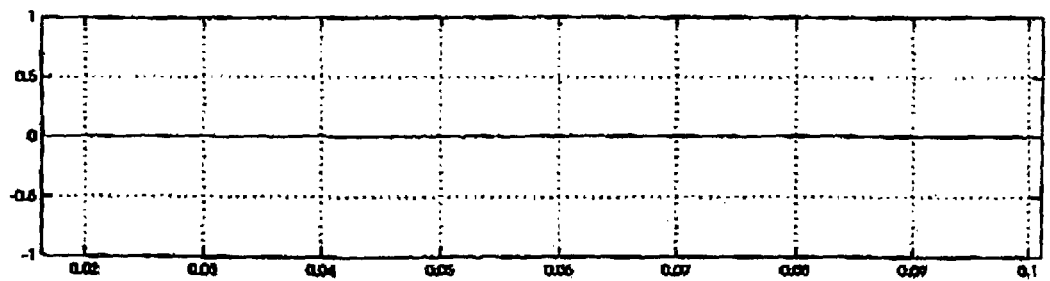

Thus, for example, the interval between each successive peak in the detection result signal 66 (e.g. measured in samples) is determined (at 96). The determined interval(s) is (are) then compared (at 98) to the known interval(s) between repeating elements of the desired signal type. If the two values match within a predetermined tolerance (such as, for example, ±1.0 percent), then the channel signal 38 can be considered to be of the desired signal type. This result is illustrated in FIG. 6d, in which a decision result signal value of binary "1" is generated in response to a "match" condition. Note that in FIGS. 6a-6b, the I-Data and Q-Data signals are terminated in response to this "Match" decision result. In contrast, the chart of FIG. 7d indicated that no match is found between the detection result signal (FIG. 7c) and the desired signal type.

As may be appreciated, the above-described decision process is particularly suited for a case in which the desired signal type is known, and the IGC 14 operates to locate a channel signal 38 conforming to that signal type. Clearly, this operation can be varied to achieve other results. For example, the receiver 16 can be controlled to scan the IF signal 27 to locate a channel signal 38 carrying valid signal traffic (e.g. by monitoring channel signal power via the switch 40 and Log amplifier 34). The DSP 18 can then be used to process the I-Data and Q-Data signals output by the IF digitizer 42 using a range of different frame lengths, until a detection result signal 66 having well defined peaks is generated. This detection result signal 66 can then be compared (e.g. as described above with reference to FIG. 5) to each one of a library 100 of known signal types so as to find the signal type characterized by known features most closely matching the detection result signal 66 closest match. The channel signal 38 can then be deemed to be a signal of that type.

In either case, when a desired signal is identified, the switch 40 of the receiver 16 can then be controlled to direct the channel signal 38 to the log amplifier 34, so that its power level can be monitored by the DCU 20. This information can be used by the DCU 20 for various system management purposes. For example, the monitored power level can be used to control the gain of the signal path 12 (e.g. via VGA 22). Additionally, the DCU can control an indicator 102 (such as, for example, a simple LED indicator; an LED bar-graph; and acoustic enunciator etc.) to indicate that the desired signal has been detected and/or its strength in the received signal Si.

The embodiment(s) of the invention described above is(are) intended to be exemplary only. The scope of the invention is therefore intended to be limited solely by the scope of the appended claims.

We claim:

1. A method for a repeater to identify a desired narrow band signal within a broadband RF signal, the method comprising steps of:

isolating a candidate narrow band signal within the broadband signal;

detecting a predetermined signal element within the narrow band signal;

analyzing the detected element to identify the signal type of the isolated narrow band signal;

wherein the step of detecting the predetermined signal element within the narrow band signal in the repeater comprises steps of:

digitizing the narrow band signal to generate a corresponding n-bit digital signal; and digitally processing the digital signal;

wherein predetermined signal element comprises a repeating feature of the narrow band signal, and wherein the step of processing the digital signal comprises a step of autocorrelating the digital signal with at least one delayed version of itself;

wherein the step of autocorrelating the digital signal comprises cascaded autocorrelation; and wherein the cascaded autocorrelation comprises steps of:

in a first stage, computing a product of the digital signal and a delayed version of the digital signal which has been subject to a delay corresponding to a one frame, wherein a length of the frame is based on an expected repetition rate of repeating features of the narrow band signal; and in each successive stage, computing a product of the product computed by the previous stage and a further delayed version of the digital signal which has been subject to an additional delay corresponding to a one frame.

2. A method as claimed in claim 1 wherein the step of isolating a candidate narrow band signal comprises steps of: downconverting the broadband RF signal to a predetermined Intermediate Frequency (IF) signal; and filtering the IF signal to isolate the narrow band signal as a selected sub-band of the IF signal.

3. A method as claimed in claim 2, wherein a bandwidth of the sub-band is either one of: substantially equal to an expected bandwidth of a channel signal within the broadband RF signal; and greater than the expected bandwidth of a channel signal within the broadband RF signal.

4. A method as claimed in claim 1, wherein the step of digitizing the narrow band signal comprises a step of sampling the narrow band signal at a sample rate that satisfies the Nyquist criterion for an expected symbol rate of the narrow band signal.

5. A method as claimed in claim 1, wherein the step of digitizing the narrow band signal comprises a step of independently digitizing In-phase (I) and Quadrature (Q) signal components of the narrow band signal, to thereby generate respective I-Data and Q-data signals.

6. A method as claimed in claim 5, comprising a further step of computing a sum of squares of the I-Data and Q-Data signals to generate a composite IQ-data signal.

7. A method as claimed in claim 1, wherein the length of a frame is based on an expected repetition rate of repeating features of the narrow band signal.

8. A method as claimed in claim 1 wherein the step of analyzing the detected repeating features comprises a step of comparing the detected repeating features to known features of a known signal type.

9. A method as claimed in claim 1 further comprising steps of: detecting a power level of the identified narrow band signal; and generating a human-perceivable output signal indicative of the detected power level.

10. A method as claimed in claim 9, wherein the human-perceivable output signal is any one of more of a visual signal and an audio signal.

* * * * *

UNITED STATES PATENT AND TRADEMARK OFFICE
CERTIFICATE OF CORRECTION

PATENT NO.        : 7,522,556 B2
APPLICATION NO.   : 11/071641
DATED             : April 21, 2009
INVENTOR(S)       : Wag Hanna et al.

Page 1 of 1

It is certified that error appears in the above-identified patent and that said Letters Patent is hereby corrected as shown below:

At Column 10, line 59, "claim 1" should be -- claim 1, --.

At Column 12, line 4, "claim 1" should be -- claim 1, --.

At Column 12, line 8, "claim 1" should be -- claim 1, --.

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,522,556 B2 | Page 1 of 1 |
| APPLICATION NO. | : 11/071641 | |
| DATED | : April 21, 2009 | |
| INVENTOR(S) | : Wag Hanna et al. | |

It is certified that error appears in the above-identified patent and that said Letters Patent is hereby corrected as shown below:

On the Title Page:

At field (73), "Ontario" should be -- Ottawa --.

Signed and Sealed this

Second Day of March, 2010

David J. Kappos
*Director of the United States Patent and Trademark Office*